United States Patent [19]
Yoshii

[11] 3,759,463
[45] Sept. 18, 1973

[54] DEVICE FOR DETECTING STOPPAGE OF ROTATION

[75] Inventor: Tetsuji Yoshii, Neyagawa, Japan

[73] Assignee: Matsushita Electric Industrial Co., Ltd., Osaka, Japan

[22] Filed: Dec. 14, 1970

[21] Appl. No.: 97,538

[52] U.S. Cl. .................... 242/186, 242/57, 242/191
[51] Int. Cl. ..................... G11b 15/18, G11b 15/44
[58] Field of Search .................... 242/186, 191, 189, 242/190, 187, 57

[56] References Cited
UNITED STATES PATENTS
3,480,230  11/1969  Hosono et al. ...................... 242/57
3,563,493  2/1971  Bielke ................................ 242/186

Primary Examiner—George F. Mautz
Attorney—Stevens, Davis, Miller & Mosher

[57] ABSTRACT

Two rotary elements, one of which is driven at a higher rate than the other, are mounted on a common shaft and a sliding member is interposed therebetween, so that when one of the rotary elements stops rotating, the sliding member is operated to change the operational direction of an associated equipment.

5 Claims, 11 Drawing Figures

DEVICE FOR DETECTING STOPPAGE OF ROTATION

BACKGROUND OF THE INVENTION

1. FIELD OF THE INVENTION

This invention relates to a device for detecting the stoppage of rotation, which is adapted for use in magnetic tape recorders and the like.

The device for detecting the stoppage of rotation, according to the present invention, is so designed that two rotary elements rotated at different rates of speed are mounted on a common shaft and a rocking member is interposed therebetween, one of said two rotary elements which is driven at a higher rate is stopped incident to the termination of forwarding or reversing of a magnetic tape, whereby the relative rotational direction of said rotary elements is reversed and as a result said rocking member is shifted to change the operational direction of an equipment which is incorporated in the recorders.

2. DESCRIPTION OF THE PRIOR ART

In the operation of a magnetic tape recorder of the type which is operative with a tape cassette, much attention is required to visually recognize the stoppage of the running magnetic tape, since occasionally the tape driving mechanism is left in operation despite of the fact that the tape has stopped running. Such a practice results in a premature failure of the driving force transmission system and shortening of the service life of the magnetic tape recorder, as wwell as in a wasteful power consumption which is uneconomical.

In the past, there have been proposed various types of rotation stoppage detecting device for use with automatic reverse-type magnetic tape recorders. These prior art devices include, for example, one using a metal foil, one utilizing the tension of the tape and one utilizing an electric signal. However, any one of them has some defects as is well known. For instance, the prior art device utilizing the tension of a magnetic tape is so designed that the ends of the tape are secured to reels and a lever for a microswitch is operated by the tape when said tape is stretched taut by a tension created therein at the end of its travel, with the result that the contact of said microswitch is closed to actuate a relay or a solenoid. This prior art device, however, has the defects that when the tape is forwarding, a tension detecting means must be pushed against the tape. So, tape sending is apt to be unsmooth and a wow and flutter are increased. Therefore, it is necessary to additionally provide electrical parts such as a relay, a magnet and a electrical circuit therefor. The use of many parts will increase the fear of failure thereof.

According to the present invention, two rotary elements rotated at different rates of speed are mounted on a common shaft, with a rocking plate interposed therebetween, and one of said rotary elements which is rotated at a higher rate is stopped in response to the termination of forwarding of the tape, so as to reverse the relative movement of said rotary elements, whereby the rocking plate is shifted and the operational direction of an associated equipment is changed by said rocking plate. Therefore, the fear of wow and flutter's increase will be eliminated and, as a result, the device will be operated without failure.

SUMMARY OF THE INVENTION

An object of the present invention is to provide a device for detecting the stoppage of rotation, which is highly reliable and capable of positively changing the operational direction of an equipment in which it is incorporated.

Another object of the invention is to provide a device for detecting the stoppage of rotation, which singly is capable of detecting the stoppage of rotation in two directions by purely mechanical means.

Still another object of the invention is to provide a device for detecting the stoppage of rotation, which does not cause an irregularity in rotation and is applicable even to small-sized equipments.

According to the invention there is provided a device for detecting the stoppage of rotation, comprising a first rotary element, the stoppage of rotation of which is to be detected, a second driven rotary element which is mounted coaxially with and rotated in the same direction as said first rotary element at a rate of speed lower than that of said first rotary element and which continues its rotation even after said first rotary element stops rotating, a rocking plate interposed between said two rotary elements and rockably mounted on a pivot pin fixed on said second rotary element at a location offset from the axis of rotation thereof, and a sliding member fixedly mounted on said rocking plate in frictional engagement with said first rotary element, said device being operative in such a manner that when said first rotary element stops rotating, the rate of rotation of said second rotary element becomes high relative to that of said first rotary element and hence the relative rotational direction of said two rotary elements is reversed, whereby said rocking place is automatically shifted and the operational direction of an associated equipment is changed by a projecting lug formed on said rocking plate.

DESCRIPTION OF THE PREFERRED EMBODIMENTS

Figure 1:
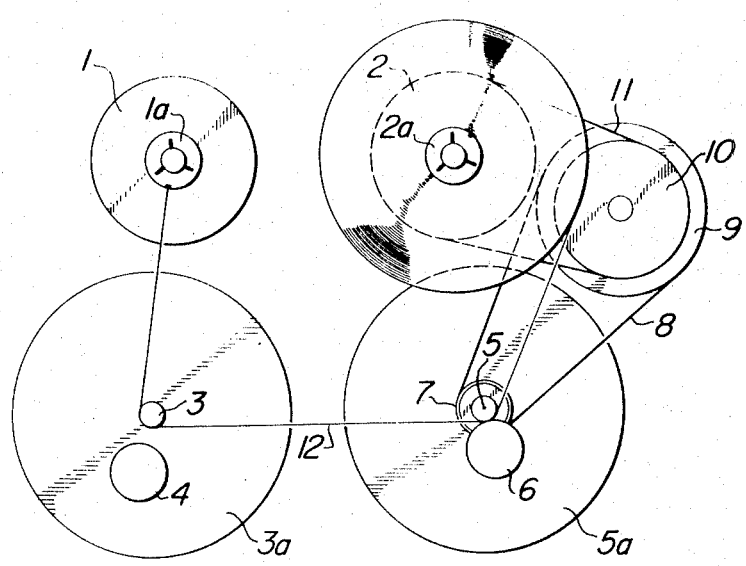
FIG. 1 is a schematic plan view of an equipment incorporating an embodiment of the device for detecting the stoppage of rotation, according to the present invention.

An embodiment of the present invention will be described hereunder as applied to a magnetic tape recorder. Referring to FIG. 1, reference numeral 1 designates a supply reel mount, 2 a take-up roll mount, 3 a tape reversing capstan, 4 a tape reversing pinch roller, 5 a tape forwarding capstan, 6 a tape forwarding pinch roller, and 7 a pulley provided coaxially with the tape forwarding capstan 5 and operatively connected by way of a belt 8 with a low speed wheel 9. Where a large output is desired from the pulley 7, the rotating speed of the low speed wheel 9 is reduced by way of gears or the like so that the torque generated by the pulley may positively be transmitted to said low speed wheel. In other words, a conventional reducer may be inserted between the pulley 7 and the wheel 9. Thus the power from the pulley 7 is transmitted to the additional reducer and then the transmitted power is fed to the wheel 9, thereby ensuring the rotation of the wheel 9 to be lower than that of the wheel 10. On the other hand, a high speed wheel 10 provided coaxially with the low speed wheel 9 is operatively connected with the take-up reel mount 2 by way of a belt 11, so as to be driven thereby in the same direction as and at a higher rate than the low speed wheel 9. Reference numeral 12 designates a magnetic tape which has the opposite ends secured to hubs 1a, 2a of the tape reels 1, 2 respectively. Thus, it will be understood that when the tape is being forwarded. the high speed wheel 10 is driven from the take-up reel mount 2, while the low speed wheel 9 is driven from the tape forwarding capstan 5 at a speed lower than that of said high speed wheel 10, until the magnetic tape stored in the tape supply reel 1 is used up. When the tape in the supply reel 1 has been used up, the take-up reel mount 2 stops rotating and, therefore, the high speed wheel 10 also stops rotating.

In the tape forwarding state of FIG. 1, the capstans 3, 5 which are respectively mounted on flywheels 3a, 5a integrally therewith, are driven in a counterclockwise direction from suitable driving means and the take-up reel mount 2 is driven in a counterclockewise direction from said driving means through a frictional rotation transmitting mechanism (not shown), and further the pinch roller 6 is in pressure contact with the capstan 5. The magnetic tape 12 wound on the hub 1a of the tape supply reel 1 is unwound by the coaction of the capstan 5 and the pinch roller 6 and taken up on the hub 2a of the take-up reel 2. Since the ends of the magnetic tape 12 are secured to the hubs 1a, 2a of the reels 1, 2 respectively, when the tape on the tape supply side has been used up, the forward movement of the tape is stopped, and at the same time, the reel mount 1 and the pinch roller 6 stop their rotation and further the reel mount 2 stops rotating due to a slipping motion of the frictional rotation transmitting mechanism.

In the tape reversing operation, the respective elements operate in a reverse way. Namely, the reel mount 1 is driven in a clockwise direction through the frictional rotation transmitting mechanism and the reel mount 2 is disengaged from the driving source. The capstans 3, 5 are driven in a reverse direction and the pinch roller 6 is moved away from the capstan 5, while the pinch roller 4 is brought into pressure contact with the capstan 3. When the tape on the reel mount 2 has been exhausted, the same operation as described previously takes place.

Figure 2:
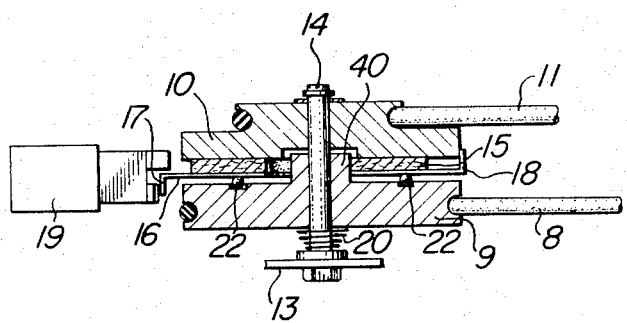
FIG. 2 is a vertical cross-sectional view of the device shown in FIG. 1.
Figure 3:
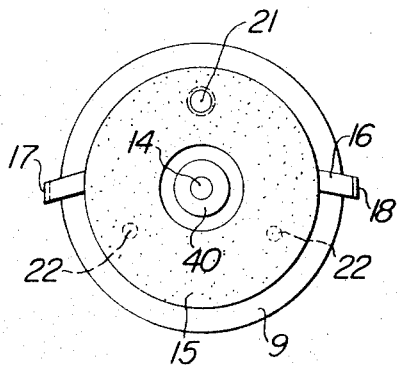
FIG. 3 is a plan view of the device of FIG. 2, with a portion removed.

As shown in FIG. 2, the high speed wheel 10 and the low speed wheel 9 are mounted on a common fixed shaft 14 which extends upright from a base plate 13 and a rocking plate 16 is interposed therebetween. The rocking plate 16 is pivotally mounted on a pivot pin 21 fixed on the low speed wheel 9 at a location offset from the center of said low speed wheel, and has a frictional sliding member 15 (consisting, for example, of a felt or non-woven fabric) adhesively bonded thereto. Further, the rocking plate 16 is formed at the substantially diametrically opposite locations with projecting lugs 17, 18 which are bent in opposite directions to each other. These projecting lugs 17, 18 are selectively projected outwardly as the rocking plate 16 is rockably shifted in one direction, to actuate a switch or any other operation controlling mechanism 19 of the magnetic tape recorder.

Figure 5:
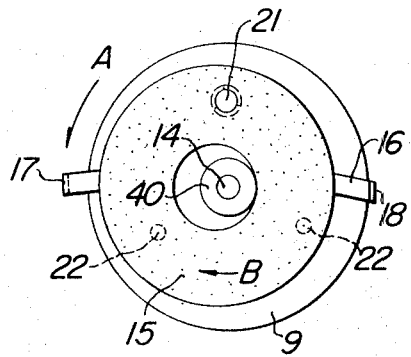
FIG. 5 is a view similar to FIG. 3, illustrating the operation of the rocking plate.
Figure 4:
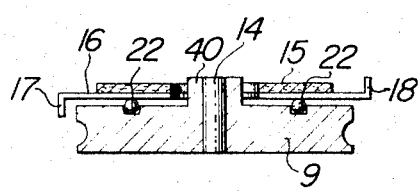
FIG. 4 is a vertical cross-sectional view of FIG. 3.
Figure 6:
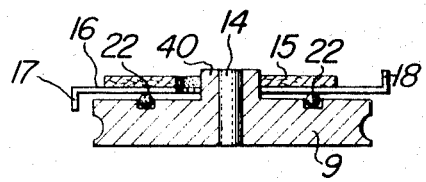
FIG. 6 is a vertical cross-sectional view of FIG. 5.

Reference numeral 20 designates a spring which urges the frictional sliding member 15 against the high speed wheel 10 to produce a frictional force between the contacting surfaces thereof when said high speed wheel 10 stops its rotation. Reference numerals 22, 22 designate steel balls interposed between the low speed wheel 9 and the rocking plate 16 to provide for smooth rocking motion of said rocking plate. The rocking plate 16 is rockably shifted to the position shown in FIG. 5 when the high speed wheel 10 has stopped its rotation and the low speed wheel 9 only is rotated in the direction of the arrow A. Namely, the frictional force created between the stationary high speed wheel 10 and the frictional sliding member 15 on the rocking plate 16, acts to rotate the frictional sliding member 15 and, therefore, the rocking plate 16 in a clockwise direction about the pivot pin 21, due to the rotation of the low speed wheel 9 in the direction of the arrow (in a counterclockwise direction), and thus the bent lug 17 is projected radially outwardly of said low speed wheel 9.

Therefore, when the tape forwarding operation as shown in FIG. 1 has been completed, the switch or the operation controlling mechanism 19 of the magnetic tape recorder is actuated by the bent lug 17 of the rocking plate 16 and thereby the movement of the tape is stopped or the moving direction of the tape is changed (for reversing) automatically. In the tape reversing operation, the high speed wheel 10 and the low speed wheel 9 are driven in the reverse direction respectively and hence the termination of the tape reversing operation can also be detected by the same device in the similar manner. In this case, however, since the rocking plate 16 is rotated in a direction opposite to the direction of the arrow in FIG. 5, the bent lug 18 is projected radially outwardly of the low speed wheel 9 and abuts against a different portion of the operation controlling mechanism 19. In the manner described, the magnetic tape is reciprocated continuously automatically. When the circular rocking plate as shown in FIGS. 3 to 8 is used, the amount of displacement of the rocking plate 15 is restricted by contacting the side wall of the center hole of the plate 15 with the boss 40 of the wheel 9. Reference numeral 40 designated bearing the portion of the low speed wheel 9.

Figure 7:
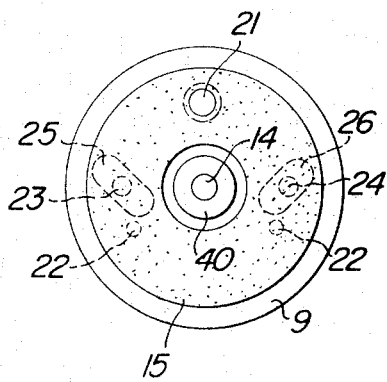
FIG. 7, 8 and 9 are views showing other embodiments of the device.
Figure 8:
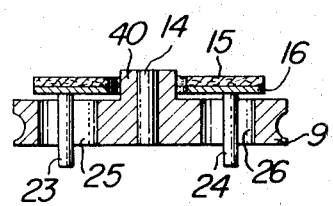
Figure 9:
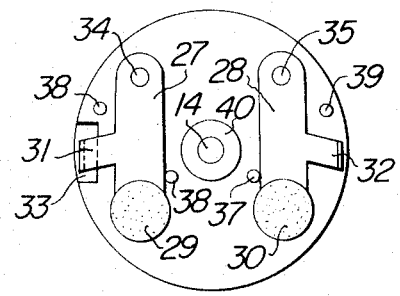

An arrangement may alternatively be made as shown in FIGS. 7 and 8, in which the rocking plate 16 is provided with projections 23, 24 extending vertically downwardly from the underside thereof through throughholes 25, 26 formed in the low speed wheel 9 respectively, with the lower ends thereof projecting downwardly outwardly of said low speed wheel 9. In this case also, the projection 23 or 24 is moved within the through-hole 25 or 26 towards the periphery of the low speed wheel 9 when the high speed wheel 10 stops its rotation. Still alternatively, an arrangement may be made as shown in FIG. 9 in which two separate rocking plates 27, 28 are provided between the high speed wheel 10 and the low speed wheel 9. Even when either one of the rocking plates 27, 28 is provided, the device can be used for detecting the stoppage of rotation in one direction. In FIG. 9 reference numerals 29, 30 designate frictional sliding members (consisting, for example, of a felt or non-woven fabric) adhesively bonded to the respective rocking plates 27, 28. Reference numerals 31, 32 designate projecting lugs formed integrally with the rocking plates 27, 28 respectively and bent in opposite directions to each other. These projecting lugs 31, 32 are selectively projected outwardly from the low speed wheel 9 depending upon the rotating direction of said low speed wheel, similar to the projections in the preceding embodiments. Reference numeral 33 designates a notch formed in the low speed wheel 9 for receiving the lug 31; 34, 35 are pivot pins for the respective rocking plates 27, 28; and 36, 37 and 38, 39 are stoppers to limit the pivotal movements of the respective rocking plates. By establishing the relation between the projecting direction of the lug and the direction of the external force imposed on the rocking plate by the pivot pin and the load of switching operation, as shown in the drawing, the moving direction of said rocking plate coincides with the direction of the load acting on the rocking plate. Therefore, the rotational force transmitted to the low speed wheel can be fully utilized as the switching force. Namely, a large switching force can be obtained. It is also possible to arrange such that an alarm indicative of the termination of the tape operation is actuated by the lug of the rocking plate.

Figure 10:
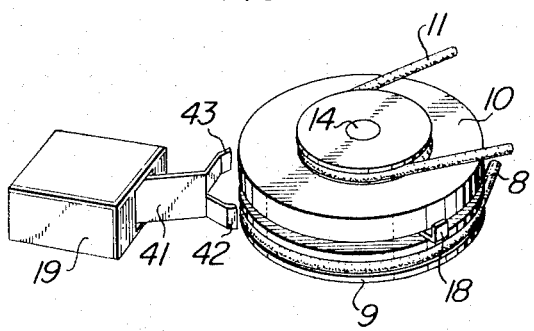
FIG. 10 is a perspective view showing the relative position of a tape end detecting mechanism and a switch which changes the operational direction of the equipment to be controlled.
Figure 11:
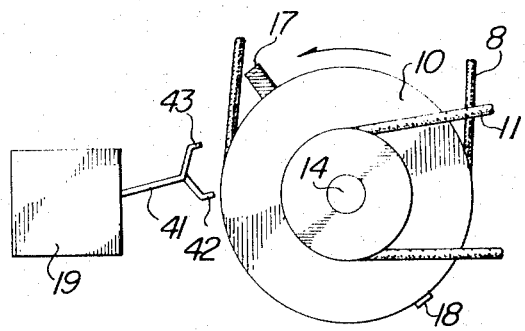
FIG. 11 is a plan view of FIG. 10.

Referring to FIGS. 10 and 11, the switch 19 has a switch operating lever 41 which takes two stationary positions on both sides of the center line of said switch, and the tip end of said switch operating lever 41 is bifurcated to form as upper engaging tab 43 and a lower engaging tab 42. The arrangement is such that when the position of the switch 19 is changed by the engagement between the projecting lug 17 and the engaging tab 42, the rotating direction of the capstans 3, 5 and the supply and take-up reel mounts or the high and low speed wheels 11, 9 of the rotation stoppage detecting device is reversed, and said detecting device starts to rotate in a clockwise direction, with the projecting lug 17 in the projected position. In this case, since the switch operating lever 41 is located in a position opposite to the position shown, the movement of the projecting lug 17 is not interfered by the engaging tab 42 of said switch operating lever 41 and a smooth reversing of the tape can be obtained. This condition lasts until the reversing of the tape ends.

When the reversing of the tape ends, the projecting lug 18 of the rocking plate 16 is now projected and brought into engagement with the engaging tab 43 of the switch operating lever 41, whereby said switch operating lever 41 is turned in a counterclockwise direction to the original position shown in FIGS. 10 and 11. In the manner described, the tape is continuously automatically reciprocated for recording and reproduction.

Although the device of the present invention has been described and illustrated herein in terms of a specific embodiment in which it is applied to operate the switch 19 which controls the rotating direction of a motor, it should be understood that the application of the subject device is not restricted only thereto but the device can be applied to operate any other mechanical control mechanism which is required to be shifted between two positions, and that the force to operate such a mechanism can be increased as desired, by adjusting the rotational force of the low speed wheel 9. According to the present invention, the detection of the tape end, the shifting of the tape operation from forwarding to reversing or vice versa, the automatic stoppage of the tape operation or the indication of the tape end by an alarm can be achieved purely mechanically. Thus, the present invention has a wide range of application.

I claim:

1. Apparatus for detecting the stoppage of rotation, comprising:
   a first rotatable element;
   a second rotatable element mounted coaxially with and rotatable in the same direction as and normally at a slower speed than said first rotatable element;
   control means for controlling the rotation of said first and second rotatable elements;
   a rocking member interposed between said first and second rotatable elements and movably mounted on a pivot pin fixed to said second rotatable element; and
   a slidable member fixedly mounted on said rocking member in frictional engagement with said first rotatable element,
   wherein when the speed of rotation of said second rotatable element exceeds that of said first rotatable element, said rocking member is pivotably moved by said slidable member about said pivot pin to a position of engagement with said control means to change the operating state of said control means.

2. Apparatus for detecting the stoppage of rotation as defined in claim 1, wherein said rocking member has at least one projecting lug formed thereon.

3. Apparatus for detecting the stoppage of rotation, as defined in claim 1, wherein said rocking member has two projecting lugs, one of which projects from the peripheral edges of said first and second rotatable elements depending upon the direction of rotation of said first rotatable element.

4. Apparatus for detecting the stoppage of rotation as defined in claim 1, wherein said first and second rotatable elements and said rocking member are arranged such that the direction in which a projecting lug of said rocking member projects and the direction of pivotal movement of said rocking member as determined by the position of the pivot point of said rocking member and an external force which said rocking member is subjected to from the load incident to the actuation of a switching element coincide with each other.

5. Apparatus for detecting the stopping of rotation as defined in claim 3, wherein a locus of rotation of one of the projecting lugs forms a locus distinguishable from that of the other, said device further comprising a driven member having two abutments which contact respective projecting lugs when the rocking member is pivoted in a given direction.

* * * * *